Patented Nov. 22, 1938

2,137,993

UNITED STATES PATENT OFFICE 2,137,993

SYNTHETIC ORGANIC MATERIAL AND PROCESS OF MAKING THE SAME

Allen D. Whipple, Alexandria, Ind., assignor to The Mantle Lamp Company of America, Chicago, Ill., a corporation of Illinois No Drawing. Application August 20, 1931, Serial No. 558,328

3 Claims. (Cl. 260—8)

The present invention relates to the class of resinous condensation and polymerization compounds which are complex esters, and it involves the interaction of a polyhydric alcohol, such as ethylene glycol, with a polybasic acid such as phthalic anhydride.

Heretofore, many condensation products have been produced by the interaction of polyhydric alcohols and polybasic acids, such as glycerin (glycerol) and phthalic anhydride, but either a suitable polyhydric alcohol was not used, or the thermal conditions by means of which condensation and polymerization were effected have not been properly controlled.

If a mixture in the proportion of one molecule of glycerin and one molecule of phthalic anhydride be melted together and the heating continued until water is driven off, the acid number of the product in the early stages will be high, and as the condensation and polymerization proceed the acid number will gradually decrease. When the acid number has been reduced to a point between 35 and 40, it will be found that the viscosity of the resulting resin has become quite high, and that the resin has become rather brittle when cooled.

If the condensation and polymerization be carried on until the acid number is lower than 30 and above 25, not only does the resin become extremely brittle, when cool, and very viscous when hot, but it also begins to exhibit considerable resistance to solution in ordinary lacquer solvents. Also, the brittleness of the cold resin is so great that its usefulness as a lacquer ingredient is very seriously impaired, and it is necessary, in order to plasticize the resin, to resort to the introduction of some compatible softening material, such as glycerin monobenzoate, or other known compatible plasticizer.

If the heating of the resin manufactured with glycerin be carried on until the resin has an acid number that is still lower than 25, the polymerization of the resin proceeds and finally a difficultly-meltable and practically insoluble resin results.

Such of said resins as have high acid numbers and are readily attacked by water are unsuitable for use in lacquers. Also, because of the great viscosity of such resins when sufficiently condensed and polymerized to form anything like a permanent resin, it is exceedingly difficult to impregnate paper with them, or to use them in the production of lacquers.

These two facts render highly desirable a process of producing resins that will not possess these undesirable properties, and it has been found that by the use of phthalic anhydride and ethylene glycol (instead of glycerin), a resin is produced which can be condensed and polymerized to a low acid number and still be sufficiently fluid when molten to be used for the ready impregnation of paper, and that can be reduced to a very low acid number and still retain the meltable and the soluble characteristics that render the resin useful for lacquer manufacture.

The temperature to which the mixture of ethylene glycol and phthalic anhydride is subjected should, preferably, be approximately 130 degrees centigrade, although desirable products may be obtained if the temperature does not fall below 110 degrees or rise above 150 degrees centigrade.

While possibly useful products which are attacked by water, are produced during the early stages of the process, other and more useful products that are unaffected by water are later produced. All of these products are slightly yellow, and, with the exception of those which are affected by water, are stable.

Tests have shown that, if the acid numbers are, respectively, 14, 18, 28 and 35, the initially-clear and transparent products will be attacked and clouded by water in a very high degree; that, if the acid numbers are, respectively, 26, 27, 36, and 37, the water attack is less severe; and that if the acid numbers are any one from 0 to 13, inclusive, or 15 to 17, inclusive, or 19 to 25, inclusive, or 29 to 34, inclusive, or 38 to 40, inclusive, the water attack is so negligible that each of the several products will retain, unimpaired, its inherent transparency and brilliancy for very long periods of time.

All of these products are soluble in methyl cellosolve, acetone, diacetone, ethylene dichloride, dichlor ethyl ether, carbitol, dioxan, cellosolve acetate and a 50–50 mixture of ethyl alcohol and ethylene dichloride, as well as other solvents, and, when dissolved, become stable lacquers or varnishes with which surfaces of various articles may be coated.

These several resins are opaque to ultra-violet light having a wave-length shorter than 317 millimicrons, and, also, are remarkably opaque to infra-red emanations, are extremely resistant to the destructive effects of sunlight or weather, and impart these beneficial properties to varnishes, lacquers and other coatings in which they may be incorporated.

Lacquered panels, exposed for break-down tests in a weatherometer, have demonstrated the longevity of lacquers compounded with the new resins hereinbefore described, as compared with commercial lacquers compounded with natural resins or commercial synthetic resins. These tests showed that, whereas the best obtainable lacquers which were compounded with natural resins or commercial synthetic resins, were completely destroyed in from 250 to 300 hours exposure in the weatherometer, those lacquers that were compounded with the resins made by the above-described process suffered no detectable change after 408 hours of exposure under the same conditions, even though the effort to detect a change was conducted with the aid of a powerful microscope.

The best practice for the performance of the process, involves the continuous agitation of the mixed materials during the heat treatment.

Having thus described my invention, what I claim is:

1. The process of producing a synthetic product, which consists in subjecting a mixture of substantially one molecule of an aromatic polycarboxylic acid and substantially one molecule of ethylene glycol, to a temperature of substantially 130 degrees centigrade, and continuing the process until the product is fusible and water-resistant.

2. The process of producing a synthetic product, which consists in subjecting a mixture of substantially one molecule of phthalic anhydride and substantially one molecule of ethylene glycol, to a temperature of substantially 130 degrees centigrade, and continuing the process until the product is fusible and water-resistant and of a required acid number.

3. A fusible water-resistant phthalic-anhydride ethylene-glycol resin condensed and polymerized at a temperature approximating 130° C., having one of the following acid numbers, namely, 0 to 13 inclusive, 15 to 17 inclusive, 19 to 25 inclusive, 29 to 34 inclusive, and 38 to 40 inclusive.

ALLEN D. WHIPPLE.